United States Patent [19]

Schoenlaub

[11] 3,832,441

[45] Aug. 27, 1974

[54] METHOD OF MANUFACTURING ZIRCONIUM OXIDE AND SALTS

[76] Inventor: Robert A. Schoenlaub, 4141 Chadbourne Dr., Columbus, Ohio 43220

[22] Filed: July 16, 1973

[21] Appl. No.: 379,370

[52] U.S. Cl. .................. 423/71, 423/82, 423/84, 423/593, 423/331
[51] Int. Cl. .................................. C01g 25/00
[58] Field of Search .............. 423/71, 82, 84, 593

[56] References Cited
UNITED STATES PATENTS

| | | | |
|---|---|---|---|
| 2,084,630 | 6/1937 | Deguide | 423/84 X |
| 2,578,748 | 12/1951 | Schoenlaub | 423/82 |
| 2,721,115 | 10/1955 | Schoenlaub | 423/71 |
| 2,721,117 | 10/1955 | Schoenlaub | 423/84 X |

FOREIGN PATENTS OR APPLICATIONS

| | | | |
|---|---|---|---|
| 116,321 | 1/1943 | Australia | 423/84 |

*Primary Examiner*—Herbert T. Carter
*Attorney, Agent, or Firm*—Cennamo, Kremblas & Foster

[57] ABSTRACT

A process for the production of calcium zirconate and zirconium oxide or salts therefrom which is characterized by reacting the mineral zircon with limestone to form calcium zirconate and tricalcium silicate. The calcium zirconate is freed from the tricalcium silicate by simple thermal steps which transform the tricalcium silicate to a form which can be separated by physical means. After light milling, the calcium zirconate can be recovered from the gangue material by mineral dressing techniques. The relatively pure form of zirconate can then be treated with acids to form zirconium sulphate which in turn is treated with well-known reagents to form zirconium oxide or other zirconium compounds.

4 Claims, No Drawings

METHOD OF MANUFACTURING ZIRCONIUM OXIDE AND SALTS

BACKGROUND

There have been many prior processes for the production of zirconium salts or oxides, all of which have experienced some difficulties which have rendered them less than wholly satisfactory.

The bulk of the commercially produced zirconium salts or oxides have long been produced by the heating of zircon and carbon to very high temperatures with the subsequent volatilizing of silicon and formation of zirconium carbide. A similar high temperature method is the mixing of iron oxide and carbon with zircon in an electric furnace to form ferrosilicon and zirconium oxide. The ferrosilicon is then removed magnetically.

These processes require high temperatures for relatively long periods of time. Also the purity of the end product is asymptotically related to the intensity of thermal treatment so that the attainment of high purity requires additional chemical processing. Therefore these processes require incurring additional costs which render them beyond the economic limits for many applications.

Many previous attempts to overcome some of the disadvantages of these very high temperature methods are represented by my prior U.S. Pat. Nos. 2,578,478; 2,721,115 and 2,721,117.

The processes disclosed therein deal with the normal reaction of zircon with basic oxides to form meta or orthosilicates and zirconium oxide. U.S. Pat. Nos. 2,721,117 is concerned with the production of calcium zirconate which is produced by reacting zircon and calcium oxide at temperatures greater than 2,600° F.

These processes while useful, still have a number of disadvantages. To free the zirconium values it is necessary to furnace the zircon and the reacting substances at relatively high temperatures. If this is done in a reverberatory furnace, the zirconia because of its high density and the fluidity of its melts drops to the bottom so that completion of the reaction and the removal of the zirconia is difficult. If the reaction is done with partial fusion in a rotary kiln, the clinker will either fuse to the kiln wall or will be incompletely reacted. Either way, the recovery is not as efficient as desirable and the cost relatively high.

The newer treatment at lower temperatures which can be commercially used also has problems connected with it. The zirconia end product is limited to a relatively fine size, approximately 1 micron. A much larger size is greatly preferred in other applications. Further, the zircon is not completely reacted and the zirconia must be removed by drastic chemical treatment which presents problems in the waste disposal of solid or liquid noxious by-products.

Therefore none of the prior art attempts to replace the high temperature volatization type processes have met with any substantial success. Further most require the use of relatively high temperatures which increase power demands without a proportional increase in the efficiency of the production. The high power demand and/or the waste problem also represent a detriment to an increasing awareness of sound ecological processes.

SUMMARY OF INVENTION

The present invention relates to a novel approach for the recovery of zirconium oxides or salts which more clearly approaches the original desire to maximize physical separation methods and minimize harsh chemical methods.

The process of the present invention is characterized by reacting zircon with a sufficient quantity of limestone to produce calcium zirconate and tricalcium silicate. This reaction requires furnace temperatures between 1,400° to 2,000° C. Lowering the temperature in two further furnace steps results in a clinker from which the calcium zirconate can be separated using physical means. Then the calcium zirconate is reacted with sulfric acid to form zirconium sulfate from which many well-known reactions may be used to produce zirconium oxide or other useful zirconium salts.

OBJECTS

It is therefore an object of the present invention to provide an improved process for the recovery of zirconia which removes many of the disadvantages connected with prior methods.

It is another object of the present invention to provide a process of the type described which may be utilized in conventional rotary, shaft or tunnel kilns at relatively lower temperatures as compared to some prior processes.

It is another object of the present invention to provide a process of the type described which is readily adaptable to conventional apparatus and automatic operation and control.

It is another object of the present invention to provide a process of the type described wherein the grain size of the zirconia values recovered are subject to more accurate control and wherein the separation of the zirconium values may be largely accomplished by physical means.

It is a further object of the present invention to provide a process of the type described wherein the efficiency of the recovery of the zirconium values is higher than prior art methods particularly when the higher power needs and/or the noxious waste problem connected with the prior processes are taken into consideration. The detriment of these problems relative to the energy crisis and to the environment is becoming increasingly evident.

DETAILED DESCRIPTION

The primary source material for producing zirconium salts or oxides is the mineral zircon. This is readily available as a sand of the composition 65% $ZrO_2$ and 33% $SiO_2$ with a small amount of the oxides of iron, and the rare earths titanium and hafnium. Other sources of zirconium of either synthetic or natural origin could be used without departing from the spirit of the present invention, however for the purposes of description, zircon will be used herein.

The first step of the process of the present invention is to add to the zircon sufficient limestone or limestone equivalent to form calcium zirconate and tricalcium silicate. The zircon and limestone is furnaced until the following reaction occurs:

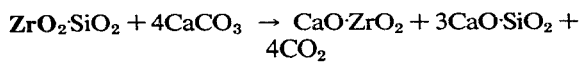

The temperature employed in firing is not particularly critical, however, a minimum temperature of approximately 1,400° C is necessary to completely react the zircon.

Preferably, the temperature employed is around 1,700° to 2,000° C to develop the calcium zirconate crystal to a larger size, such as 30 to 50 microns for example.

The slightly higher temperature range for furnacing does increase production costs slightly, but the larger zirconate crystals are easier to separate from the gangue and therefore compensate for the slightly increase cost. Conventional shaft kilns are well adapted to this process.

Shaft kilns are intrisically recuperators and for this reason high temperatures can be economically obtained. Also, a shaft kiln provides a long retention with slow cooling so that the thermal treatment described in the present invention can be obtained in a single operation.

Suitable molar combining weights for zircon and the calcium carbonate represented in the limestone and zircon are 183 and 400 respectively. The molar combining weights of the products of this reaction are 179 for calcium zirconate, 228 for tricalcium silicate and 176 for the carbon dioxide formed.

More limestone than the stated amounts may be used and is beneficial as it tends to force iron and other contaminates to the gangue and also gives more free lime which aids in the subsequent separation steps.

In most commercial furnaces it is necessary to provide a briquetted feed. Since the major component of the present process is limestone, which loses about 44 percent of its weight as carbon dioxide, it is difficult to form a strong and abrasion-resistant briquet. Therefore it would be preferable to briquet hydrated or quick lime in equivalent amounts. These materials form their own bonds and are strong and abrasion resistant and require less thermal treatment than a limestone feed.

It should also be noted that some firing equipment operates better if there are fluxes present which can form a small amount of liquid or glass, such as in rotary kilns for example. Common fluxes, such as fluorine, volatilize easily in basic systems such as represented here and therefore are largely ineffective. However lime and alumina or iron oxide can be added to form tricalcium aluminate or dicalcium ferrite or tetracalcium alumina ferrite. They then function as fluxes much in the same manner as they do in Portland cement clinker. The iron and alumina may also be present in the limestone or zircon. Compensating limestone should then be added to the batch.

In some applications, it is advantageous to use a monovalent or divalent oxide in addition to the lime, such as for example, magnesia, baria or soda. These oxides lower the fusion temperature and tend to promote a more rapid growth of calcium zirconate with the result that larger crystals are formed at lower temperatures.

The clinker formed in the initial reaction stated above ideally contains 44 percent calcium zirconate and 56 percent tricalcium silicate. These minerals are so interlocked that physical spearation is difficult. However, chemical separation based upon differential solubilities is possible but not economically promising.

The next step in the process of the present invention is to free the calcium zirconate which is accomplished by lowering the temperature of the clinker to below 1,250° C for a sufficient period to permit the following reaction to occur:

The clinker at this point contains 44 percent calcium zirconate, 42.4 percent beta dicalcium silicate and 13.6 percent lime.

This furnacing reaction can be done in the same kiln as the initial reaction or in a separate kiln if desired.

The clinker is next cooled to below 725° C. Upon cooling below about 725° C, the beta dicalcium silicate will invert to gamma dicalcium silicate with an accompanying shattering of the silicate crystals to a very fine powder which has a specific gravity of 3.0. The lime present has a specific gravity of 3.4 and if hydrated a specific gravity of about 2.4. The calcium zirconate is present as much larger crystals than the gangue material and has a specific gravity of 4.7.

Cooling mixture in a steam atmosphere will cause hydration of the lime and facilitate separation. At this stage part of the zirconate is free and removable. The silicate however, inverts to very fine elongated prisims which hold the zirconate crystals in an interlocking structure like a brush heap. The zirconate can be freed by light milling such as in a ball mill using relatively small balls which abrade but do not crush the zirconate.

The calcium zirconate can then be recovered by either air or water classification.

Air classification provides the calcium silicate in a dry powder which has some hydraulic properties and may be useful directly in such products as sand lime brick, fillers in plastic, or agricultural lime. Water classification tends to give a cleaner product due to the hydration and solution of lime which tends to concentrate at grain boundaries. However, the slurry must then be dewatered. For the best results, I prefer to first use a rough air classification and then use a final separation by water.

The product from the classification step is calcium zirconate of a purity which often can be used directly as a refractory. It has basic reactions much like lime and magnesia but it is stronger and has a lower thermal conductivity so that it may be used advantageously in furnace wall and arch construction. It may also be used to contruct and fettle hearths in reverberatory furnaces. Moreover it does not hydrate like lime and magnesia and it possesses a melting point of 2,340° C versus 2,580° C for magnesia and 2,820° C for lime.

To produce zirconia and zirconium salts, the calcium zirconate may be reacted with acids. Sulferic acid is preferable since it renders lime as well as any residual silicon insoluble while zirconium sulfate or the oxysulfate is soluble. The final separation may then be made by filtration.

Zirconium carbonate for cosmetic uses may be made by reacting the zirconium sulfate with ammonium carbonate. Other zirconium salts can be made using similar well-known reactions.

Also while the zirconium sulfate is in the soluble form, any hafnium present can be removed to produce zirconia and hafnia for atomic reactors. Zirconia textiles can be made from soluble zirconium salts by the process used in making Welsbach mantles.

The production of zirconia from the soluble salt such as the sulfate can be done by drying and heating to about 400° C. Sulfer trioxide is driven off and can be recovered and recycled if desired in a conventional manner. The temperature of firing determines the size of the oxide crystals. At temperatures of about 1,000° C, the oxide crystals are about 1 micron in size which is optimum for a pigment carrier. At 1,200° to 1,400° C the crystals formed are larger and in these sizes they are more useful as abrasives or as refractories.

In the pure form, zirconia is a monoclinic crystal which inverts on heating to a tetragonal form with a destructive change in dimension. This inversion can be prevented by incorporating into the tetragonal crystal other substances called stabilizing agents which upon cooling prevent the inversion from occuring.

Commonly used substances such as lime in amounts of about 4 percent and yittrium oxide in amounts of about 7 percent can be incorporated with the soluble zirconium sulfate and then fired to produce a stabilized form which does not invert.

As an example of the invention, the following may be given:

Example I

I mix 183 parts of zircon with 400 parts of limestone. I fire this to 1,800° C for 30 minutes. I drop the temperature to 1,150° C and hold for 2 hours. I then cool the mixture below 725° C to allow the tricalcium silicate to dust. Then by the combination of this inversion reaction and subsequent hydration and light milling, the calcium zirconate is separated from the gangue. I then air classify this to obtain about 190 parts of concentrates, comprising about 95 percent of the calcium zirconate and about 217 parts of dicalcium silicate powder which I discard. I then reclassify in water and obtain about 170 parts of concentrate comprising almost pure calcium zirconate with a little water. I then add 300 parts of sulfuric acid which forms gypsum and zirconium sulfate. Any silica carried over will be in the form of a gel. Additional water is added and the zirconium sulfate removed in solution and the gypsum and silica gel removed by filtration with washing.

Example II. I mix 183 parts of zircon with 440 parts of limestone and 16 parts of iron oxide. I fire this to 1,500° C for about two hours and obtain a clinker composed primarily of calcium zirconate, tricalcium silicate and dicalcium ferrite. I then lower the temperature of these products to about 1,150° C for 2 hours to cause the tricalcium silicate to form beta dicalcium silicate and lime. I then cool the clinker to below 725° C to cause the beta dicalcium silicate to invert to gamma dicalcium silicate with the accompanying destructional dimensional change. The resulting clinker is then dusted, hydrated and lightly milled in preparation of the classification step to separate the calcium zirconate from the gangue.

The calcium zirconate is then treated in the same manner as in Example I.

Example III. I mix 183 parts of zircon with 420 parts of limestone and five parts of bauxite. I fire this mixture to 1,700° C for 1 hour. I then cool the clinker to 1,100° C for 3 hours to permit the formation of dicalcium silicate from tricalcium silicate. The clinker is cooled again to below about 725° C.

The clinker was then treated in the same manner as in Example I to free the calcium zirconate from the gangue.

What is claimed is:

1. A process for producing calcium zirconate which comprises the steps of forming a mixture of zircon and sufficient limestone or limestone equivalent to provide at least three molecules of calcium oxide for each molecule of silica in the zircon plus one molecule of calcium oxide for each molecule of $ZrO_2$ present, causing a solid state reaction by heating said mixture to a temperature between approximately 1,400° C to approximately 2,000° C for a time sufficient to form tricalcium silicate and calcium zirconate; cooling the fired mass to a temperature below approximately 1,250° C but above approximately 725° C for a sufficient time to permit the tricalcium silicate to form beta dicalcium silicate and lime; cooling the resulting clinker again to a temperature below approximately 725° C to cause the beta dicalcium silicate to invert to gamma dicalcium silicate with an accompanying reduction in size of the silicate crystals to a very fine powder; and then physically separating the larger calcium zirconate crystals from the smaller gamma dicalcium silicate crystals.

2. The process as defined in claim 1 wherein the calcium zirconate is separated from the gamma dicalcium silicate by either air and/or water classification after light milling of the clinker cooled below approximately 725° C.

3. The process as defined in claim 2 wherein the calcium zirconate recovered from the classification step is reacted with sulfuric acid to form soluble zirconium sulfate and insoluble forms of lime and residual silicates.

4. The process as defined in claim 1 wherein a fluxing agent is added to the zircon and limestone prior to the initial firing step, said fluxing agent being one taken from a group comprising iron oxide and aluminum oxide, and accordingly increasing the amount of limestone added to the initial mixture.

* * * * *